United States Patent [19]
Saka et al.

[11] Patent Number: 5,434,790
[45] Date of Patent: Jul. 18, 1995

[54] VERSATILE PRODUCTION SYSTEM AND PALLET USED FOR THE SYSTEM

[75] Inventors: Nobuo Saka, Kanazawa; Junichi Oda, Kahoku; Yasuaki Ishiyama, Kahoku; Kazumi Miyasaka, Kahoku; Katsunao Sasaki, Kahoku; Eiichi Terabayashi, Kahouku; Hiroyoshi Terashima, Kanazawa, all of Japan

[73] Assignee: PFU Limited, Ishikawa, Japan

[21] Appl. No.: 22,026

[22] Filed: Feb. 24, 1993

[30] Foreign Application Priority Data

Oct. 29, 1992 [JP] Japan .................. 4-291655

[51] Int. Cl.⁶ .............................................. G05B 19/418
[52] U.S. Cl. .................................... 364/468; 364/478; 364/474.11; 364/132
[58] Field of Search ................ 364/132, 468, 478, 403, 364/402, 401, 474.11, 469–473; 235/375, 376; 414/273, 274, 403, 410; 340/825.3, 825.31; 198/341, 349, 349.5–349.95, 347–347.4

[56] References Cited

U.S. PATENT DOCUMENTS

| | | | |
|---|---|---|---|
| 4,958,292 | 9/1990 | Kaneko et al. | 364/468 |
| 5,077,674 | 12/1991 | Tischler et al. | 364/468 |
| 5,086,397 | 2/1992 | Schuster et al. | 364/468 |
| 5,097,421 | 3/1992 | Maney et al. | 364/478 |
| 5,150,288 | 9/1992 | Imni et al. | 364/468 |
| 5,166,874 | 11/1992 | Nomaru et al. | 364/468 |
| 5,166,884 | 11/1992 | Maney et al. | 364/468 |
| 5,214,588 | 5/1993 | Kaneko et al. | 364/468 |
| 5,231,585 | 7/1993 | Kobayashi et al. | 364/468 |

FOREIGN PATENT DOCUMENTS 0129482 12/1984 European Pat. Off. .

OTHER PUBLICATIONS

Patent Abstracts of Japan, vol. 9, No. 135 (M-386) 1985 & JP-A-60016348.
Patents Abstracts of Japan, vol. 12, No. 190 (M-704) 1988 & JPA 62297049.
Patent Abstracts of Japan, vol. 13, No. 258 (M-838) 1989 & JPA 01064759.
H. Itoh and I. Sakamoto, "Special Edition: Total Production System—CIM—Commitment to CIM in PFU Kasajima Works," *Fujitsu Journal No. 197*, vol. 18, No. 4, 1992, pp. 60–69. (An English Language Translation Is Attached.).

*Primary Examiner*—James P. Trammell
*Attorney, Agent, or Firm*—Staas & Halsey

[57] ABSTRACT

A versatile production system in which a communication-memory unit is attached to a product, or to a pallet carrying the product, while the product is conveyed along the production line. The communication-memory unit communicates with a line host controller via line terminals located at production line assembling and testing sites in order to send information relating to the product from the communication-memory unit to the line host controller and to the communication-memory unit from the line host controller. Information can also be transferred from the communication-memory unit to the line terminals for output to a production worker and input by a production worker from a line terminal to the communication-memory unit. In this manner, the communication-memory unit contains manufacturing information relating to the product and this information is electronically updated at each production line site. The communication-memory unit can be emplaced in the side surfaces, top surfaces, or bottom surface of a pallet so as to allow communication and be detachable from the pallet. A pallet could also include an indented storage area or a basket-like enclosure to accommodate subassemblies or test equipment placed therein.

30 Claims, 9 Drawing Sheets

Fig.5

```
           LINE TERMINAL
EQUIPMENT
NAME     : OWS-D(3.5)
PRODUCT NO.: 50055
                        PARTS
NO. UNIT-CD  UNIT NAME  NO.       LOT NO.  YR.MTH.
01  2500636  PWR115A    38812     02A      91 10
02  UOZE     CPU-110    IZ0120    05A
03  UOXJ     IFC-3C     IZ0287    01A

READ OUT OF BARCODE
                              PF24 → K B
BARCODE1
BARCODE2

PF1: COMPLETE   PF3: DELETE
```

LINE TERMINAL DISPLAY

Fig.6

PACKING MATERIAL PREPARATION ORDER SHEET

| NO.229 | CUSTOMER F9754A2<br>EQUIP.CODE 05988<br>PACKING LINE 01 | PACK MATERIAL 047/006-A<br>FOAM MATERIAL 047/006-B<br>ATTACHED DRWGS C10L-2020-B341 | RECEIV. DATE 92.08.25<br>RECEIV. TIME 18.01.57<br>DELV. PARTS NO. 1340<br>CONTROL NO. |
|---|---|---|---|
| NO.230 | CUSTOMER F9754BL2<br>EQUIP.CODE 06318<br>PACKING LINE 01 | PACK MATERIAL 047/006-A<br>FOAM MATERIAL 047/006-B<br>ATTACHED DRWGS C10L-2020-B344 | RECEIV. DATE 92.08.25<br>RECEIV. TIME 18.02.29<br>DELV. PARTS NO. 1206<br>CONTROL NO. |
| NO.231 | CUSTOMER F9754BL2<br>EQUIP.CODE 06318<br>PACKING LINE 01 | PACK MATERIAL 047/006-A<br>FOAM MATERIAL 047/006-B<br>ATTACHED DRWGS C10L-2020-B344 | RECEIV. DATE 92.08.25<br>RECEIV. TIME 18.03.12<br>DELV. PARTS NO. 1202<br>CONTROL NO. |

VERSATILE PRODUCTION SYSTEM AND PALLET USED FOR THE SYSTEM

BACKGROUND OF THE INVENTION

1. Field of the Invention

The present invention relates to a versatile production system; that is, a production system for manufacturing diverse items of products on a single line. This invention also relates to a pallet employed on a production line, on which products are assembled and tested, for use in the versatile production system.

2. Description of the Prior Art

In general, a production line for products comprises a series of processes; that is, a process of supplying parts required for assembling a product, a process of assembling and manufacturing a product, a process of testing and inspecting the performance of an assembled product, and a process of feeding an accepted product to a packing site. It is preferable for mass production to install a production line for each product. When diverse item products are manufactured in small quantities, however, large factory space and a large number of production facilities are required. When products are manufactured in small quantities having a separate production line for each product, idling time increases, and sections of occupied factory space, production facilities, and operators become redundant.

Accordingly, a versatile production system for producing multiple kinds of products on a single line has been realized, which solves the above problems. When production volume must be dealt with flexibly and a required product must be manufactured in specific quantities, a work order sheet must be delivered to an operator stationed at respective workplaces. Such work order sheets can include information such as the content of work, production sequence, supplied material and quality control for each product. On receipt of the order, the operator must assemble, test and inspect a product, and compile a test result report. The operator must also record information pertaining to defective parts on a work sheet and feed back the information.

When multiple item products must be manufactured in small quantities, the foregoing versatile production system of a prior art poses problems such as: excessive time and labor is needed for processing information concerning the production line, an operator has an excessive amount of responsibility, operational errors may occur and production efficiency deteriorates.

On the other hand, on a versatile production line for assembling, testing, and finishing multiple kinds of products, a pallet used as a base is transported to the versatile production line and is loaded with a product. In the prior art, a pallet employed for the versatile production line is simply a platform that is not provided with a communication-memory unit serving as a data carrier for communicating and storing data concerning each assembly process or test process performed on the versatile production line. In each assembly process or test process, an operator transfers necessary information using a work order sheet.

The foregoing pallet of the prior art is simply a base for loading a product during assembly or testing. But for a work order sheet or other means, information concerning assembly and testing performed from an initial process to a current process on a versatile production line cannot be transferred when needed during an assembly process or a testing process on the production line. Therefore, an operator is obliged to move from one workplace to another, which reduces work efficiency.

SUMMARY OF THE INVENTION

The present invention attempts to solve the foregoing problems.

The first object of the present invention is to provide a versatile production system that is flexible and responds to a demand for manufacturing diverse item products in small quantities, automatically supplies a necessary work order to the operators working on a production line so that various kinds of products can be manufactured, automatically feeds back information about defective products, automatically creates a test result report, and solves the aforesaid problems.

In consideration of the aforesaid problems, the second object of the present invention is to provide a pallet having a communication-memory unit that communicates and stores data concerning each assembly or test process on a versatile production line, thereby improving work efficiency.

FIG. 1 is a basic construction drawing of a versatile production system of the present invention. The versatile production system of the present invention, which achieves the first object, assembles multiple kinds of products individually on a single production line, tests and inspects and transports the products to a packing site, comprising:

(1) assembling sites 1 for assembling multiple parts that are delivered in the order in which they are assembled and that make up a single product;

(2) testing sites 2 for testing and inspecting the performance and quality of an assembled product, and transporting a product determined as defective to a retiring site or transporting a product determined as non-defective to a packing site;

(3) a plurality of main line terminals 3 that are installed in the assembly sites 1 and testing sites 2;

(4) a communication-memory unit that is attached to a product or a pallet for loading a product so as to match the flow of an article and relevant information, and that communicates manufacturing data including a type and a parts number for each product with the main line terminals 3 and stores the manufacturing data while being transported;

(5) a line host controller 5 that reads data from the communication-memory unit 4 via the main line terminals 3 installed in the workplaces of the assembly sites 1 and testing sites 2, that uses the read data to output work order sheets for operators working at the assembly sites 1 and testing sites 2 via the main line terminals 3, that outputs a test result report containing test/inspection record data for a product that has been assembled, tested and inspected, and finally determined as non-defective via a line terminal installed at a final testing site that is connected over a LAN to a packing site host controller (not illustrated) installed at a packing site, and that outputs a delivery order sheet that relates to products being delivered and assists in preparations for packing via a control terminal (not illustrated) of the packing site host controller; and (6) a line host control terminal 6 that directly inputs or outputs the data relating to production management and quality control and including master file maintenance, work order control, progress control, schedule arrangement, and product history control from or to the main line host controller 5.

The operation of a versatile production system that achieves the first object of the present invention will be described. A line host controller 5 reads data written in a communication-memory unit 4, which is transported to assembling sites 1 and testing sites 2, via line terminals 3. Using the read data, the line host controller 5 instructs the operators at the assembling sites 1 and testing sites 2 to output work orders so as to display units via the line terminals 3. The line host controller 5 then outputs a test result sheet containing test/inspection record data on a product that has been assembled, tested, inspected and finally determined as non-defective via a printer of the line terminal installed at a final testing site. Furthermore, the line host controller 5 outputs a delivery order sheet that relates to products being delivered and assists in preparations for packing, by a printer of a control terminal connected via a LAN to a packing site host controller at a packing workplace, at which products are packed. The line host controller 5 communicates progress information via a production management system (not illustrated), and information on faulty units via a quality control information control system (not illustrated).

Referring to FIG. 7A a pallet 101 used for a production line of the present invention, which achieves the aforesaid second object of the present invention, loads a product body throughout a versatile production line for assembling and testing multiple products. The pallet 101 includes a communication-memory unit 102 that communicates and stores data concerning assembling processes and testing processes on the versatile production line, and that is emplaced in the side surface of the pallet 101 so as to enable communication and detachment.

Alternatively, the communication memory unit 102 may be emplaced at the top or the bottom of the pallet 101 so as to enable communication and detachment.

Referring to FIG. 10, the pallet 101 includes a storage area 120 that is an indentation for accommodating subassemblies and test equipment that are placed therein.

The pallet 101 may have a basket-like enclosure.

The operation of a pallet used for a versatile production system that achieves the second object of the present invention will be described. In a versatile production system, a pallet 101 used on a production line of the present invention communicates and stores data concerning assembling processes or testing processes on a versatile production line when a communication-memory unit 102 is emplaced in the side surface thereof so as to enable communication. Since the communication-memory unit 102 is emplaced in the side surface of the pallet 101, the entire surface of the pallet 101 for loading a product body or subassemblies can be utilized. Furthermore, since the communication-memory unit 102 emplaced in the pallet 101 is detachable, the communication-memory unit 102 can be easily replaced. Since the communication-memory unit 102 can be emplaced in the top or bottom of the pallet 101 so as to enable communication and detachment, if information is exchanged with a communicating means installed for each assembling or testing process, the location at which the communicating means is installed is flexible.

BRIEF DESCRIPTION OF THE DRAWINGS

FIG. 5 shows an example of a display screen of a line terminal in an assembling site;

FIG. 6 shows an example of a packing material preparation order sheet;

DESCRIPTION OF THE PREFERRED EMBODIMENTS

Figure 1:
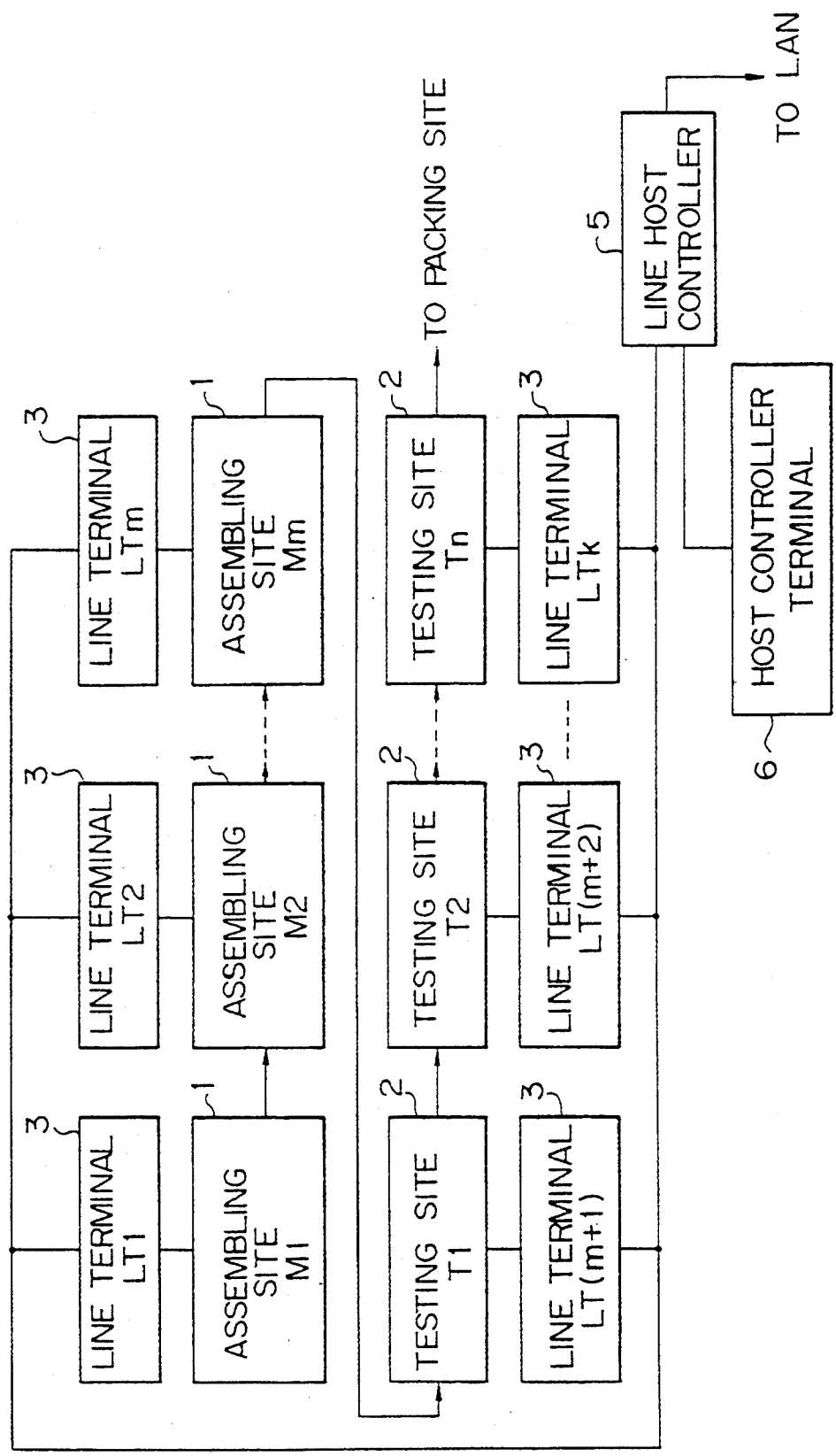
FIG. 1 is a basic construction drawing of a versatile production system of the present invention.
Figure 2:
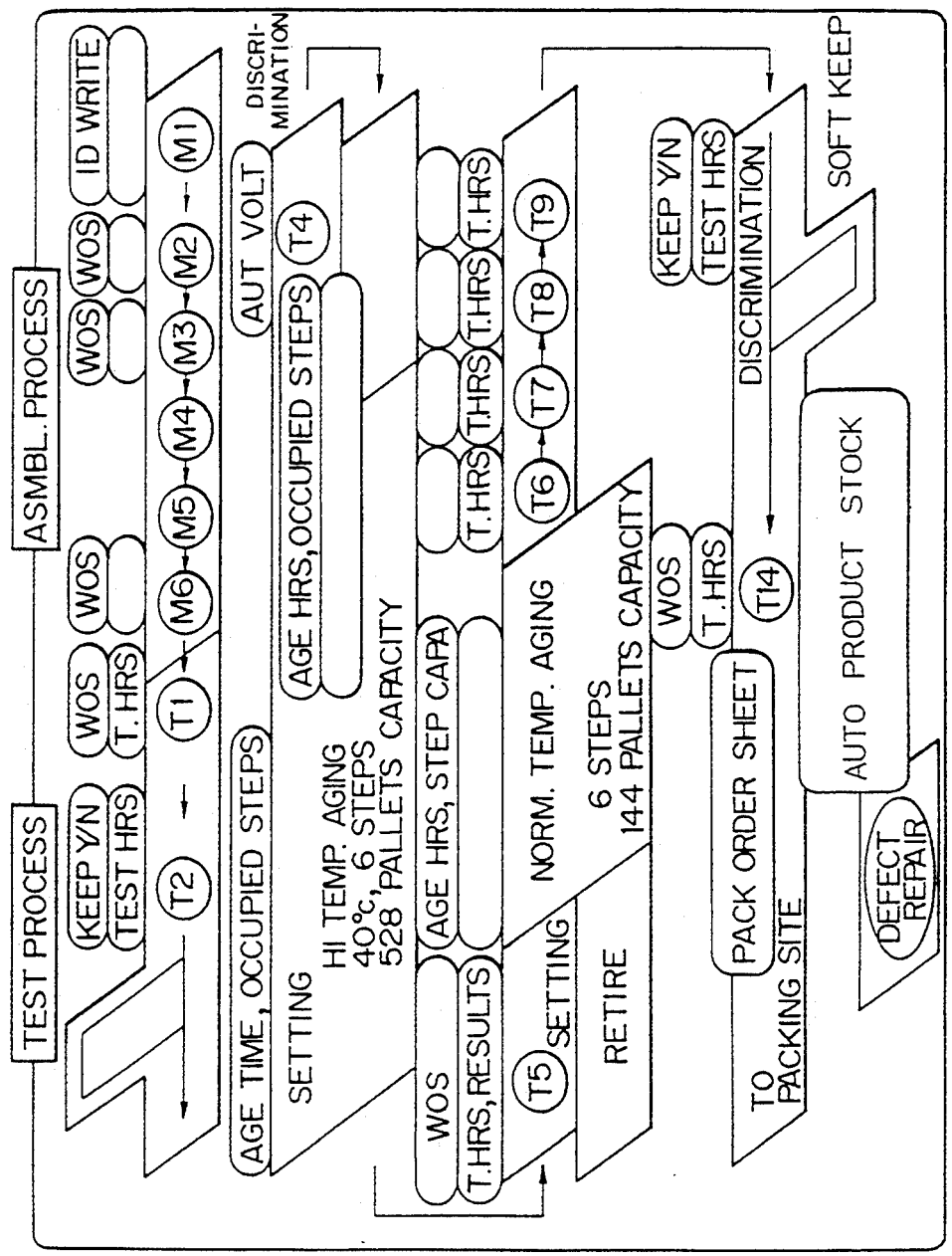
FIG. 2 shows an embodiment of a versatile production system of the present invention.

FIG. 2 shows an embodiment of a versatile production system of the present invention. In FIG. 2, M1 to M6 denote assembly sites for assembling products. T1 to T14 denote testing sites for testing and inspecting semi-assembled products. A semi-assembled product implies an integrated body of parts making up a product, which is then transported during the assembling process, from assembly to completion of assembly, to the first testing site T1. In the assembling sites M1 to M6, semi-assembled products 1 to 6 are assembled. The assembling sites M1 to M6 include temporary parts supply stations (not shown), in which parts required for the type of product are stored. Trolleys are used to distribute parts, each of which distributes parts to the assembling sites M1 to M6 in the order in which the parts are assembled. Some assembling sites may not be used depending on the number of parts. In this embodiment, an ID card (not shown) serving as a communication-memory unit or a data carrier is attached to a pallet for loading a product. The ID card is used to transfer information necessary for manufacturing products to or from a line host controller via line terminals.

Figure 3:
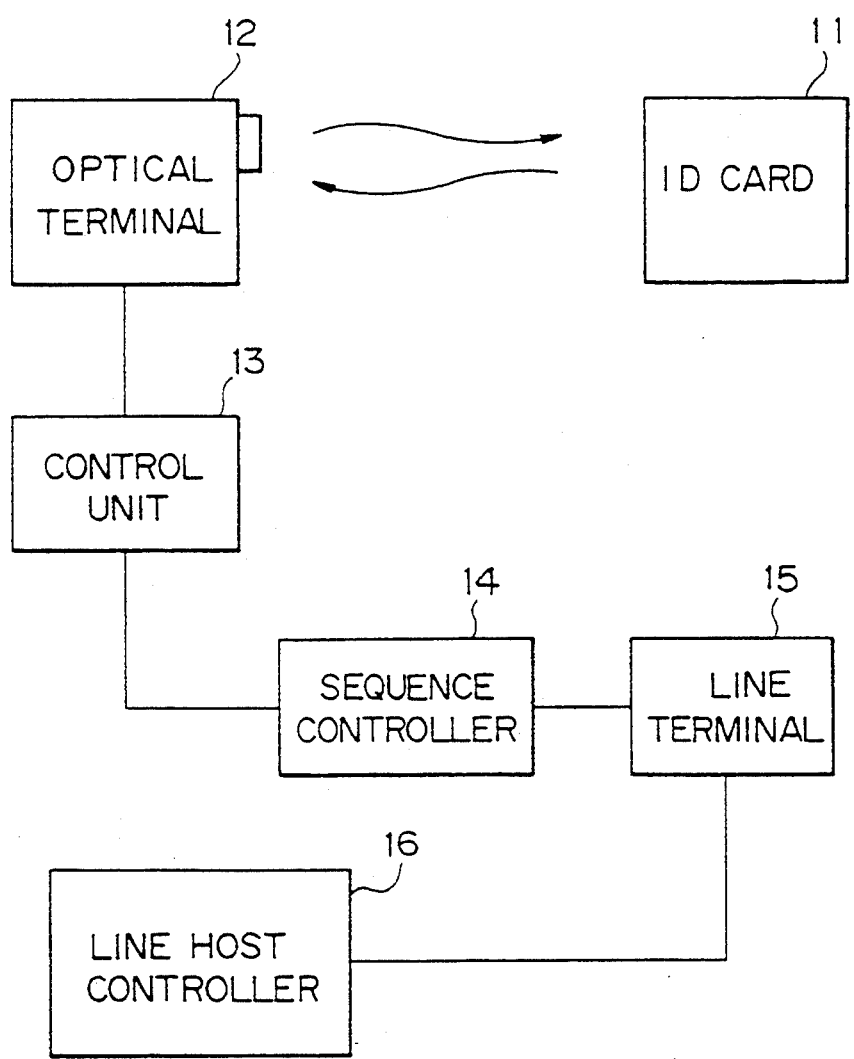
FIG. 3 shows hardware for linking between an ID card and a line host controller.

FIG. 3 shows hardware for linking between an ID card and a line host controller. In FIG. 3, a numeral 11 denotes what is referred to as an optical ID unit or an ID card in the present invention. The ID card 11 is attached to a product or a pallet for loading a product, and an optical terminal 12 is installed in each assembling site or each testing site. When the ID card arrives, a photoelectric switch installed in each assembling or testing site detects the presence of the ID card and a sequencer 14 stops a conveyor belt, which is not shown. The assembling or testing is then started. Beforehand, communication with the ID card 11 is performed via the optical terminal 12 to read or write data therefrom or thereon. Reading or writing data is effected by a line terminal 15 in each workplace under the control of a line host controller 16. A signal transferred via the optical terminal 12 is amplified by a control unit 13. The control unit 13 is preferably connected through the sequencer 14 or directly to the line terminal 15 using an RS-232C interface.

A line terminal in an assembling site M1 transmits a products code corresponding to a product type that has been entered by a keyboard or by reading a bar code to a line host controller. The line host controller writes data for an ID card on the ID card. Such data can include a products code, a control number, a process number, a work start time, a work end time, and test patterns. Writing data to an ID will be described later via a semi-assembled product handling terminal. The line host controller then informs an operator of the data for an ID card by outputting an assembling work order sheet to a CRT monitor or printer connected to the semi-assembled product handling terminal. The operator in the assembling site M1 starts driving a transporting means or a conveyor belt (not shown) so as to transport an assembled product according to the work order sheet.

At assembling sites M2 to M6, semi-assembled product terminals or line terminals installed therein read the product code, control number, and other data from the ID card attached to the pallet transported sequentially to the workplaces. The semi-assembled product terminals also read data pertaining to the type, part numbers, lot numbers, and the manufacturing dates of the parts making up the semi-assembled product, for example, from the bar codes attached to the parts. The semi-assembled product terminals then transmit the read data to the line host controller. The line host controller informs operators of the above data by outputting the assembly work order sheets associated with the assembling sites M2 to M6 to CRT monitors or printers connected to the respective semi-assembled product terminals. The work order sheets will be stored in the line host controller. The operators start driving transporting means or conveyor belts (not shown) to feed semi-assembled products 1 to 6, which are being assembled, to the assembling sites at the subsequent steps. Finally, the semi-assembled product 6 is transported to a testing site T1.

A testing terminal or a line terminal in the testing site T1 reads the products code and the control number from the ID card attached to the transported pallet and identifies the type, part numbers, lot numbers, and manufacturing dates of the parts making up the product by reading, for example, bar codes attached to the parts. The testing terminal then transmits this data to the line host controller. The line host controller determines whether any part is missing from the semi-assembled product 6, then issues a work order indicating, for example, Missing Part Found to a CRT monitor or a printer connected to the testing terminal, thus informing the operator. Moreover, the testing terminal writes, on the ID card the data acquired in the testing site T1. This data includes a process number, a work start time, a work end time, and the results of determination indicating the presence or absence of a defect. The operator then starts driving a transporting means or a conveyor belt (not shown) to feed the semi-assembled product 6 to a testing site T2.

A line terminal in the testing site T2 reads the data of products code and the control number from the ID card attached to the transported pallet, then transmits this data to the line host controller. The line host controller checks and determines whether Software Keep should be executed; that is, if a test program should be written in the hard disk of the product. The line host controller then informs an operator of the results of the check by outputting the result to a CRT monitor or a printer connected to the line terminal. When it is determined that Software Keep should not be executed, the operator starts transporting the semi-assembled product to a testing site T3 at the next step and, when it is determined that Software Keep should be executed, the operator temporarily places the semi-assembled product on a Software Keep shelf, writes a test program on the hard disk of the product, and starts transporting the semi-assembled product to the testing site T3 at the next step.

A line terminal at the testing site T3 reads the data of products code and the control number from the ID card attached to the transported pallet, and then transmits the read data to the line host controller. The line host controller checks to determine if the semi-assembled product 6 should be retired (i.e. subjected, as a returned article, to a repairing process), then informs an operator of the result of the check by outputting the results to a CRT monitor or a printer connected to the line terminal. When it is determined that the semi-assembled product should be retired, the operator places the semi-assembled product 6 at a retiring site. When it is determined that the semi-assembled product should not be retired, the operator checks a setting order indicating the conditions for setting high-temperature aging and low-temperature aging apparatuses, then sets the aging apparatuses according to the setting order. In the setting, the operator sets the aging time, relative to a set aging voltage to, for example, two hours at a voltage L (a little lower than 5 V) or twelve hours at a voltage VH (a little higher than 5 V), and specifies the number of steps occupied by each aging apparatus depending on the size, or especially, the height, of a semi-assembled product. The operator then starts driving a transporting means inside the high-temperature aging apparatus toward a testing site T4 at the next step.

The number of occupied steps is set to six for each of the high-temperature aging and normal-temperature aging apparatuses. A transporting means covering six steps is installed, and depending on the height of a semi-assembled product, two or three steps are occupied for each semi-assembled product. The high-temperature aging apparatus consists of transporting means for outgoing and incoming paths. The normal-temperature aging apparatus includes a transporting means for an outgoing path alone. A retiring site is preserved not only in testing site T3 but also in testing sites T4, T5, T7, and T14.

A line terminal in the testing site T4, which situated outside the outgoing path of the high-temperature aging apparatus, reads the data of the products code and the control number from the ID card attached to the transported pallet, and then transports the read data to the line host controller. The line host controller outputs the received data to a CRT monitor or a printer connected to the line terminal, thus reporting whether or not the semi-assembled product 6 has an automatic voltage change function. When the semi-assembled product 6 has said an automatic voltage change function, the operator does not respond when the semi-assembled product 6 does not have an automatic voltage change function, the operator modifies the set voltage value manually. The operator then starts driving a transporting means in the high-temperature aging apparatus to transport the semi-assembled product 6 through the outgoing path of the high-temperature aging apparatus toward a testing site 5 at the next step.

A line terminal in the testing site T5, which is situated outside the outgoing path of the high-temperature aging apparatus, reads the data of the products code and the control number from the ID card attached to the transported pallet, and then transmits the read data to the line host controller. The line host controller outputs the aging time for the normal-temperature (room-temperature) aging apparatus and the number of occupied steps for the semi-assembled product to a CRT monitor or a printer connected to the line terminal, thus informing an operator of the data. The operator sets the aging time for the normal-temperature aging apparatus and the number of occupied steps as informed, and then starts driving a transporting means in the normal-aging apparatus.

After normal-temperature aging is completed, the semi-assembled product is transported to a testing site T10. A line terminal in the testing site T10 reads the data of the products code and the control number from the ID card attached to the transported pallet, and then transports the read data to the line host controller. The line host controller outputs the received data to a CRT monitor or a printer connected to the line terminal, thus informing an operator whether Software Keep should be executed; that is, whether an operating system should be written. When Software Keep should be executed, the operator executes a write operation and, following that, the operator starts driving a transporting means to a packing site toward a testing site T14. When Software Keep should not be executed, the operator starts driving the transporting means without Software Keep.

A line terminal in the testing site T14 reads the data of the products code and the control number from the ID card attached to the transported pallet, and then transmits the read data to the line host controller. The line host controller issues a test result report to a printer connected to the line terminal at the testing site T14. Moreover, the line host controller executes Stocking After Testing; in other words, the line host controller reports the completion of assembly and inspection to a production management system. Furthermore, the line host controller communicates via a packing site host controller at a packing site over LAN, and informs an operator of a packing work order indicating that a cardboard box required for packing should be prepared to transport a semi-assembled product to the packing place by outputting the packing work order to a printer or a CRT monitor connected to the administration terminal of the packing site host controller. On the other hand, the line terminal in the testing site T14 writes the data acquired in the testing site T14 on the ID card. Such data includes a process number, a work start time, a work end time, and the results of a determination representing the presence or absence of a defect. Finally, the operator starts driving a transporting means or a conveyor belt (not shown) so as to feed the product to the packing site.

The features of the versatile production system in conjunction with an embodiment will be described. The first feature is that individual units of product manufacturing information can be controlled using ID cards.

Figure 4:
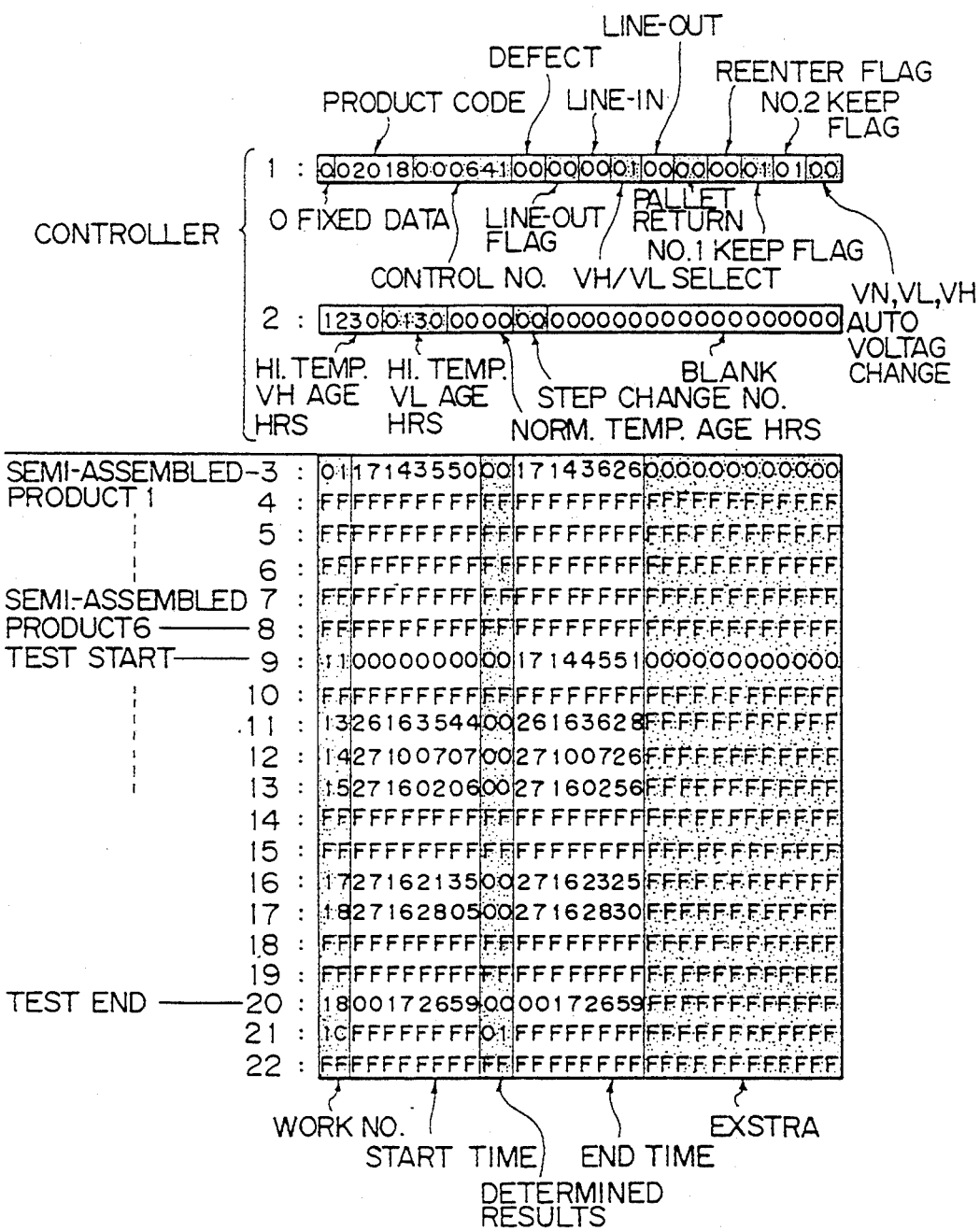
FIG. 4 shows a format of an ID card.

FIG. 4 shows a format of an ID card. An ID card employed in the embodiment has a storage capacity of 2K bytes as shown in FIG. 4. A 32-byte memory area (herein, one byte consists of four bits) is allocated to each of the 22 addresses. In this memory map, data stored at address 1 are fixed data, a products code, a control number, data indicating the presence or absence of a defect, a line-out flag, a line-in flag, selection of VH or VL, Line-out Process, Pallet Return, a re-entry flag, a No.1 Keep flag, a No.2- Keep flag, and Automatic Voltage Change of VN, VL, and VH. Data stored at address 2 are a high-temperature VH aging time, a high-temperature VL aging time, a normal-temperature aging time, Step Change, and supplementary data related to line control. Data stored at addresses 3 to 8 are the process numbers, start times, the results of determination, end times, and supplementary data of semi-assembled products 1 (assembling site M1) to semi-assembled products 6 (assembling site M6). Data stored at addresses 9 to 10 are process numbers, start times, the results of determination, end times, and supplementary data of semi-assembled products from the beginning of the test process (at a testing site T1) to the end of the test process (at a testing site T14).

The contents of the memory will be described as a supplement. Fixed data represents a leading address of a memory area and is set to 0. The products code and the control number indicate a product type and a parts number respectively. The presence or absence of a defect indicates whether or not a part is missing or an abnormality is found in the results of a test. The line-out flag provides identification data indicating that a product should be neither assembled nor tested until a product, in which a defect is detected, reaches the first retiring space. The line-in flag specifies re-entry; that is, provides data indicating whether or not product is retired, or in which process a retiring order is issued. For example, 00 represents No Retired Product. 01 represents Retire Order issued in Process 1. Selection of VH or VL indicates whether VH or VL is set to an automatic power Change unit installed at a testing site T4. Line-out Process indicates a process in which a product is retired. Pallet Return is data indicating whether a pallet should be returned to a leading process by passing through or bypassing the high-temperature aging apparatus. The re-entry flag specifies whether or not the product is a re-entered article. The No.1 Keep flag specified whether or not to load a test program. The No.2 Keep flag specifies whether or not to load an operating system on a hard disk. Automatic voltage Change of VN, VL, and VH indicates whether a product has an automatic voltage change function.

The high-temperature VH aging time, high-temperature VL aging time, and normal-temperature aging time, which reside at address 2, are provided, for example, as data 1230, indicating that aging continues for twelve and a half hours. Step Change indicates the selection of one step, two steps, or three steps. The process numbers residing at addresses 3 to 22 are concerned with assembling sites M1 to M6 or testing sites T1 to T14. The start time or end time is written in the form of a date, hours, minutes, and seconds. The results of the determination indicate the presence or absence of a defect.

As described above, an ID card stores data of each product. As a semi-assembled product is transported over a production line, the ID card is read and written at assembling and testing sites. Based on these data, up-to-date and accurate work orders are issued. Communication with a quality information system and a production management system enables the common use of data and offers support to quality control and production management systems.

The second feature is that a product history can be controlled automatically.

As part of the serving line operations, the versatile production system checks the compatibility of a product number and the lot number for each of the mounted component parts such as a printed circuit board unit, the power supply, a floppy disk unit, and a magnetic disk unit. These component parts represent the component parts of an office computer. The line operators can view the parts on monitor screens.

FIG. 5 shows an example of a display screen of a line terminal at an assembling site. In FIG. 5, the equipment name corresponds to the product code, and the product number corresponds to the control number. Also displayed are a product number, a unit CD, a unit (part) name, a parts number, a lot number, and a manufacturing data for each of the parts mounted to the product.

The product history is controlled by entering a bar code attached to each of the mounted parts to the versatile production system in each of the semi-assembly processes. The data concerning the mounted parts are stored as mounted information in the versatile production system (product history data master file), and used to automatically print a test result report when work is completed. Support for these functions relieves an operator from having to fill out a check sheet, a work order sheet attached to a printed circuit board, and a test result. With the product history data master file, a product code or the shipping time of a product can be retrieved by referencing a lot number or a parts number, or retrieval can be effected by specifying a product code, which reinforces the interchangeability of data.

The third feature is that the progress of particular processes or particular goods being processed can be supervised.

In the past, the progress of processes has been supervised by a production management system, whereby the production management system controls only parts supply orders and reports on products stocked following testing. Therefore, control of the progress of a process or goods being processed was the responsibility of the staff in the field. If a defect occurred, it would take an excessive amount of time to retrieve goods being processed. The introduction of the versatile production system of the present invention permits the control of semi-assembled products being processed, test start times, test end times, packing states, and faulty machinery in the line. This enables the supervision of all goods being processed. Moreover, a progress control function can be realized, and the number of semi-assembled products, units under testing and the units that have been tested can be determined, and the progress can be displayed relative to the scheduled number of units tested on that day.

The fourth feature is that detailed defect information can be controlled.

Detailed defect data are registered in and controlled by a quality information system. A database of detailed defect information is then constructed to ensure a supply of detect information to an operator or the issuance of a work order to an operator. Information pertaining to a faulty machine is transferred to a file in a factory quality information system (FOCUS). Thereby, required information can be supplied to a repair process, which is independent of the versatile production system, in order to process defect information statistically or resolve a defect. Moreover, the information pertaining to a defect can be fed back to a unit maker concerned.

The fifth feature is that automatic stocking can be effected.

On a versatile production line, in the final test process, completion data is read automatically from an ID card. The completion data is then collated with planned test completion data existent in a production management system. A test completion result is then compiled and transmitted to the production management system. The planned test completion data fetched from a database in the production management system is transferred to a line host controller on the versatile production line, and then collated with the acquired test completion data in the test completion process. The database in the production management system is then updated as test completion result data, which enables automatic stocking without using slips.

The sixth feature is that centralized packing support processing can be done.

A centralized packing system for packing major products at a single site has been adopted to facilitate packing efficiency and realize consistent versatile production from assembling steps through testing and packing.

A centralized packing support system communicates with line host controllers on multiple versatile production lines on different floors over LAN using a packing site control host controller thereof. The centralized packing support system then reports product information (type and parts number) acquired at the completion of tests undertaken on the versatile production lines on the different floors to the packing site floor. The running state of each production line can be supervised on the packing site floor and, based on this information and packing material master data, a packing material delivery order sheet, shown in FIG. 6, is issued, which enables timely supply of packing materials to a packing operator.

FIG. 6 shows an example of a packing material preparation order sheet which by viewing this order sheet, an operator at a packing site can identify the size of a cardboard box required for packing and the size of the foaming material operation manual attached thereto, and make preparations for packing before a product arrives at the packing sites.

Figure 7A:
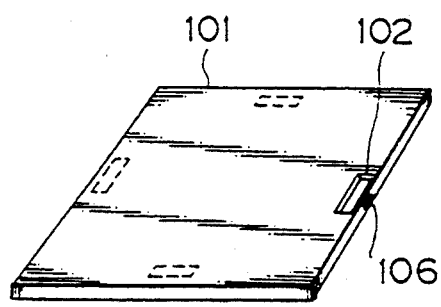
FIG. 7A is a perspective view of the first embodiment of a pallet of the present invention.
Figure 7B:
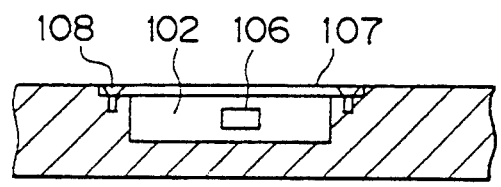
FIG. 7B is a side view of the first embodiment of a pallet of the present invention.

FIG. 7A is a perspective view of the first embodiment of a pallet of the present invention. FIG. 7B is the side view of the same. In FIGS. 7A and 7B, 101 denotes a pallet, and 102 denotes a communication-memory unit. 106 denotes a hole. 107 denotes a clamp. 108 denotes a set screw. As illustrated, the communication memory unit 102 is emplaced in the side surface of the pallet 101 so as to enable communication. The communication-memory unit 102 enables the communication and storage of data acquired in each assembling or testing process on a versatile production line. Since the communication-memory unit is emplaced in the side surface of the pallet, the entire surface of the pallet can be employed for loading a product body or subassemblies. Furthermore, the communication-memory unit is emplaced so as to be detachable. Therefore, if necessary, the communication memory unit can easily be replaced. The hole 106 is bored to enable optical communication. The communication-memory unit 102 is secured with the clamp 107 and set screw 108. In the first embodiment, the communication-memory unit 102 can be attached to any of the side surfaces of the pallet.

Figure 8A:
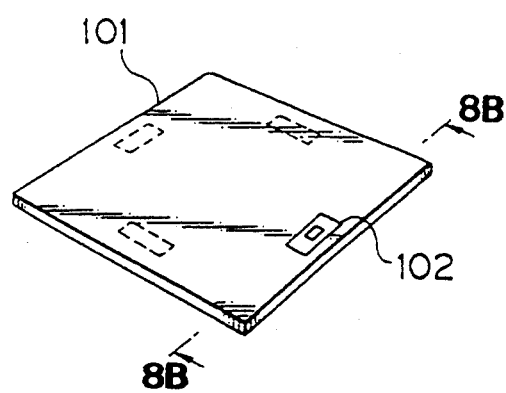
FIG. 8A is a perspective view of the second embodiment of a pallet of the present invention.
Figure 8B:
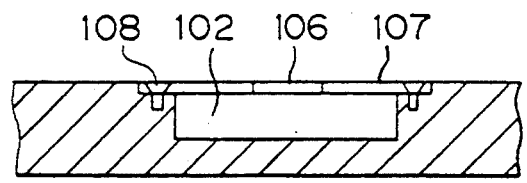
FIG. 8B is a cross-sectional view of the second embodiment of a pallet of the present invention.

FIG. 8A is a perspective view of the second embodiment of a pallet of the present invention. FIG. 8B is the cross-sectional view of the same. When a communication-memory unit 102 is emplaced in the side surface of a pallet 101, a communicating means used to exchange information in each assembling or testing site may not be installed. However, when the communication memory unit 102 is emplaced in the top or bottom of the pallet 101 so as to enable communication and detachment, the location of the communicating means is flexible. The other construction is substantially identical to that of the first embodiment.

Figure 9:
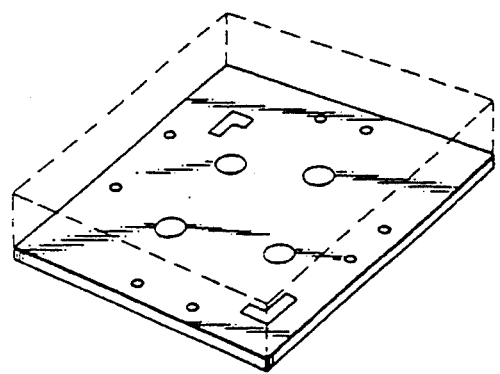
FIG. 9 is a perspective view of the third embodiment of a pallet of the present invention.

FIG. 9 is perspective view of the third embodiment of a pallet of the present invention. As shown in FIG. 9, the pallet has a basket-like enclosure 130 so that a product body or subassemblies loaded on the pallet will not fall while being carried on a production line.

Figure 10:
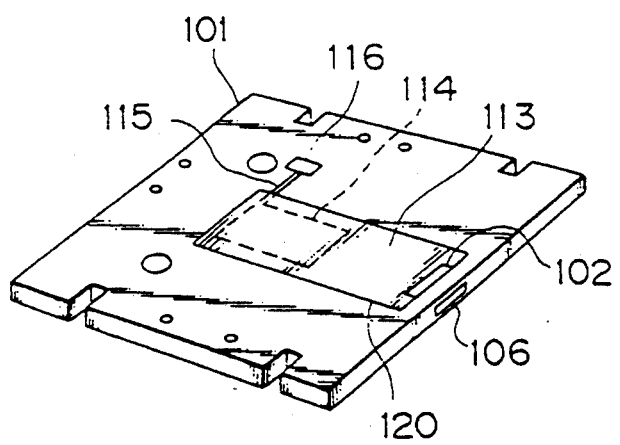
FIG. 10 is a perspective view of the fourth embodiment of a pallet of the present invention.

FIG. 10 is a perspective view of the fourth embodiment of a pallet of the present invention. As shown in FIG. 10, a storage area 120 is bored on a pallet to accommodate a pseudo I/O unit 114 and a communication memory unit 102. The communication-memory unit 102 enables optical communication through a hole 106. A pseudo I/O unit connector 116 is secured with a bracket 113 and a set screw (not shown), and connected to the connector 116 via a cable 115. The connector 116 can be connected to a product after the product has been assembled and when the product undergoes a functional inspection. If necessary, a power unit may be accommodated in the storage 120.

As described so far, according to a versatile production system of the present invention, the product code, control number, and the names of the parts of a product to be assembled and tested can be imparted to an operator using a display unit or the like. Based on the data on an ID card, control of a versatile production line, determination of whether to write software on a product, control of aging time, or determination of whether to retire a faulty product is imparted by issuing a work order, thereby ensuring a versatile production line that manufactures various products efficiently using a single line.

Furthermore, the problems of goods in process occurring at steps after delivery from a parts stock room to distribution to a product stock room are reduced and the man-hours required for assembling and testing is reduced significantly. Space efficiency in a factory is improved, product quality and reliability is also upgraded, and the required amount of equipment investment is reduced. All of these factors contribute to greatly improve the productivity of a production line system. The effective use of the properties of databases enables automated control of a products history or automated information retrieval of, for example, defect information. Over a LAN, line host controllers of a versatile production system, which are installed on different floors, can communicate with a centralized packing support system. The versatile production system and centralized packing support system can share up-to-date data necessary for packing. Furthermore, the versatile production system can apply to production management or quality control owing to the capacity for communicating with a production management system or quality information system.

As described previously, a pallet used for a production line, in which the present invention is implemented, includes a communication-memory unit that is emplaced in the side surface thereof so as to enable communication and storage of data acquired in each assembling or testing process on a versatile production line. Since the communication-memory unit is emplaced in the side surface of the pallet, the entire surface of the pallet can be used for loading a product body or subassemblies. The communication-memory unit is emplaced in the pallet so as to be detachable. Therefore, the communication-memory unit can be easily replaced. Since the communication-memory unit can be emplaced in the top or the bottom of the pallet so as to enable communication and detachment, if information is exchanged with a communicating means in each assembling or testing process, the location of the communicating means is flexible. A pallet having a basket-like enclosure successfully prevents a product body or subassemblies loaded on the pallet from falling during transportation on a production line. A pallet accommodating a pseudo I/O unit or a power unit permits easy connection between the pseudo I/O unit or power unit with the product thereon after assembly is completed. Compared with the case in which the pseudo I/O unit or power unit is placed on a pallet, a wider assembly space is ensured, which results in excellent workability. According to the present invention, a pallet used for a production line can ensure the above advantages.

We claim:

1. A versatile production system in which parts are assembled into products and operators perform work assignments issued on work orders, the versatile production system comprising:

a first site at which parts are assembled into products, an operator being positionable at the first site for assembling products at the first site;

a second site at which products are tested, an operator being positionable at the second site for testing products at the second site;

means for determining if a product at the second site is defective or non-defective;

a third and a fourth site;

production line conveying means for mechanically conveying a product, comprising:
  means for conveying an assembled product from the first site to the second site,
  means for conveying a product, determined to be defective by the means for determining, from the second site to the third site, and
  means for conveying a product, determined to be non-defective by the means for determining, from the second site to the fourth site;

a line host controller which electronically outputs and receives data;

first and second line terminals, electronically connected to the line host controller, the first line terminal corresponding to the first site and the second line terminal corresponding to the second site, which electronically receive data output by the line host controller, electronically send data to the line host controller and output human-readable data, the line host controller outputting work orders through the first and second line terminals to issue work assignments to operators at the first and second sites;

a line host controller terminal, electronically connected to the line host controller, which inputs data to the line host controller and outputs data received from the line host controller;

a communication-memory unit, corresponding to an individual product and conveyed with the product by the production line conveying means, which communicates selectively with the first terminal when the communication-memory unit is positioned at the first site and communicates selectively with the second line terminals when the communication-memory unit is positioned at the second site to allow data to be written to the communication-memory unit from the respective first and second line terminals and data to be read from the communication-memory unit by the respective first and second line terminals, the line host controller outputting work orders to issue work assignments based on data written to the communication-memory unit and data read from the communication-memory unit.

2. A versatile production system according to claim 1, wherein the communication-memory unit is attached to the product.

3. A versatile production system according to claim 2, wherein the communication-memory unit is detachable from the product.

4. A versatile production system according to claim 1, further comprising optical communication means for allowing the communication-memory unit to optically communicate with the first and second line terminals.

5. A versatile production system according to claim 1, further comprising wireless communication means for allowing the communication-memory unit to wirelessly communicate with the first and second line terminals.

6. A versatile production system according to claim 1, wherein the communication-memory unit comprises one of a magnetic tape, a magnetic card and a semiconductor memory chip.

7. A versatile production system according to claim 1, wherein the first and second line terminals each comprise:
an input unit comprising at least one of a keyboard and a bar code reader; and
an output unit comprising at least one of a CRT monitor and a printer.

8. A versatile production system according to claim 1, wherein the product is placed on a pallet, the pallet with the product placed thereon is transferred by the production line conveying means and the communication-memory unit is attached to the pallet.

9. A versatile production system according to claim 8, further comprising a product function checker which resides on the pallet and is electrically connected to the communication-memory unit, the product function checker comprising a processor, an input unit and an output unit, wherein one of a printer and a display device is connected to the first and second line terminals.

10. A versatile production system according to claim 8, wherein the pallet has respective side surfaces, a top surface and a bottom surface and the communication-memory unit is emplaced, so as to be detachable, in a surface selected from the group comprising each of the respective side surfaces, the top surface and the bottom surface.

11. A versatile production system according to claim 10, wherein the pallet has an indented storage area which accommodates subassemblies or equipment loaded therein.

12. A versatile production system according to claim 11, wherein the pallet includes an enclosure.

13. A pallet for use in a versatile production system according to claim 10, wherein the pallet has an enclosure.

14. A versatile production system according to claim 8, wherein the communication-memory unit is detachable from the pallet.

15. A versatile production system as in claim 1, further comprising:
a plurality of first sites, including an initial first site and a final first site, which are sequentially arranged from the initial first site to the final first site, a product being partially assembled from parts at each of the plurality of first sites so that a completed product is formed at the final first site by sequentially passing through each of the plurality of first sites;
a plurality of line terminals, at least one line terminal corresponding to each of the plurality of first sites; wherein
the production line conveying means conveys a partially assembled product sequentially through each of the plurality of first sites from the initial first site to the final first site and conveys a completed product formed at the final first site to the second site, and
the communication-memory unit selectively communicates with a respective line terminal when the communication-memory unit is positioned at one of the first sites and second site corresponding to the respective line terminal.

16. A versatile production system according to claim 15, wherein the communication-memory unit is attached to the product.

17. A versatile production system according to claim 16, wherein the communication-memory unit is detachable from the product.

18. A versatile production system according to claim 15, further comprising optical communication means for allowing the communication-memory unit to optically communicate with the line terminals.

19. A versatile production system according to claim 15, further comprising wireless communication means for allowing the communication-memory unit to wirelessly communicate with the line terminals.

20. A versatile production system according to claim 15, wherein the communication-memory unit comprises one of a magnetic tape, a magnetic card and a semiconductor memory chip.

21. A versatile production system according to claim 15, wherein the line terminals each comprise:
an input unit comprising at least one of a keyboard and a bar code reader; and
an output unit comprising at least one of a CRT monitor and a printer.

22. A versatile production system according to claim 15, wherein the product is placed on a pallet, the pallet with the product placed thereon is transferred by the production line conveying means and the communication-memory unit is attached to the pallet.

23. A versatile production system according to claim 22, wherein the communication-memory unit is detachable from the pallet.

24. A versatile production system according to claim 22, further comprising a product function checker which resides on the pallet and is electrically connected to the communication-memory unit, the product function checker comprising a processor, an input unit and an output unit, wherein one of a printer and a display device is connected to the plurality of line terminals.

25. A versatile production system according to claim 22, wherein the pallet has respective side surfaces, a top surface and a bottom surface and the communication-memory unit is emplaced, so as to be detachable, in a surface selected from the group comprising each of the respective side surfaces, the top surface and the bottom surface.

26. A versatile production system according to claim 22, wherein the pallet includes an indented storage area which accommodates subassemblies or equipment loaded therein.

27. A versatile production system according to claim 22, wherein the pallet includes an enclosure.

28. A versatile production system according to claim 15, wherein at least one of the plurality of first sites ascends and descents in accordance with the height of a product.

29. A versatile production system as in claim 15, further comprising a plurality of second sites, wherein:
   at least one line terminal corresponds to each of the plurality of second sites;
   the product line conveying means conveys a product from the final first site to any one of the plurality of second sites and at least one of the plurality of second sites ascends and descents in accordance with the height of the product; and
   the communication-memory unit selectively communicates with a respective line terminal when the communication-memory unit is positioned at one of the first sites and second sites corresponding to the respective line terminal.

30. A versatile production system in which parts are assembled into products and operators perform work assignments issued on work orders, the versatile production system comprising:
   a first site at which parts are assembled into products, an operator being positionable at the first site for assembling products at the first site;
   a second site at which products are tested, an operator being positionable at the second site for testing products at the second site;
   means for conveying an assembled product from the first site to the second site;
   a line host controller which electronically outputs and receives data;
   first and second line terminals, electronically connected to the line host controller, the first line terminal corresponding to the first site and the second line terminal corresponding to the second site, which electronically receive data output by the line host controller, electronically send data to the line host controller and output human-readable data, the line host controller outputting work orders through the first and second line terminals to issue work assignments to operators at the first and second sites;
   a line host controller terminal, electronically connected to the line host controller, which inputs data to the line host controller and outputs data received from the line host controller;
   a communication-memory unit, corresponding to an individual product and conveyed with the product by the production line conveying means, which communicates selectively with the first terminal when the communication-memory unit is positioned at the first site and communicates selectively with the second line terminals when the communication-memory unit is positioned at the second site to allow data to be written to the communication-memory unit from the respective first and second line terminals and data to be read from the communication-memory unit by the respective first and second line terminals, the line host controller outputting work orders to issue work assignments based on data written to the communication-memory unit and data read from the communication-memory unit.

* * * * *

UNITED STATES PATENT AND TRADEMARK OFFICE
CERTIFICATE OF CORRECTION

PATENT NO. : 5,434,790
DATED : July 18, 1995
INVENTOR(S) : Saka et al.

It is certified that error appears in the above-indentified patent and that said Letters Patent is hereby corrected as shown below:

Column 5, line 51, "card" should be --card,--.

Column 6, line 57, "said" should be deleted.

line 58, "respond when" should be --respond. When--.

Column 9, line 24, "result." should be --result report.--.

Signed and Sealed this

Thirty-first Day of October 1995

Attest:

BRUCE LEHMAN

Attesting Officer     Commissioner of Patents and Trademarks